Patented Dec. 27, 1927.

1,654,215

UNITED STATES PATENT OFFICE.

ALPHONSE GAMS AND GUSTAVE WIDMER, OF BASEL, SWITZERLAND, ASSIGNORS TO SOCIETY OF CHEMICAL INDUSTRY IN BASLE, OF BASEL, SWITZERLAND.

ALDEHYDE CONDENSATION PRODUCT AND PROCESS OF MAKING SAME.

No Drawing. Application filed October 7, 1926, Serial No. 140,208, and in Switzerland October 22, 1925.

Our invention relates to the manufacture of condensation products of acrolein and urea. It comprises the process of manufacture thereof and the new products themselves, as well as the application of the same in the industry of artificial materials.

It is known that resin soluble in alcohol can be made by polymerizing acrolein and that these resins are useful as varnishes; also that acrolein can be condensed with phenols, the products being of the nature of the material known by the registered name "Bakelite".

The present invention relates to the manufacture of a new kind of condensation product from acrolein, by causing acrolein to react with urea or a derivative thereof.

Under suitable conditions acrolein reacts readily with ureas, the course of the reaction depending on the one hand on the proportion of the acrolein to urea, and on the other hand on the presence or absence of catalysts, solvents or diluents and also on the temperature of the reaction.

The proportion of acrolein to urea may be varied within wide limits and according to the proportions selected different products are obtained under conditions of reaction which are in general the same. For example, with a proportion of ½ mol. of acrolein to 1 mol. of urea there is obtained under suitable conditions a highly viscous syrup; with a proportion of ¾ mol. of acrolein to 1 mol. of urea the final products are gelatinous. When the proportion is above ¾ mol. (for example about 1 mol.) of acrolein to 1 mol. of urea, solid vitreous products are obtained under similar conditions.

When acrolein reacts directly with urea, that is to say without the use of catalysts and solvents, the reaction occurs as a rule somewhat slowly at low temperature. Consequently the temperature should be raised above the boiling point of acrolein (52° C.), that is to say, it is advantageous to conduct the operation in a closed vessel.

When a catalyst is used the reaction proceeds fairly quickly, even at temperatures below 50° C., and according to the choice or quantity of the catalyst, the reaction may become so violent at room temperature that cooling must be adopted.

Suitable catalyst are inorganic or organic acids or bases, such as sulphuric acid, acetic acid caustic soda solution, ethylene diamine; acid or basic salts also serve.

In many cases, particularly when working at low temperatures, it is advantageous to facilitate the starting of the reaction by addition of a solvent. In this case it is not necessary to dissolve the whole of the urea, a much smaller proportion of the solvent sufficing. In other cases it is of advantage to control or moderate the reaction by addition of a diluent. As suitable solvents or diluents may be named water, methyl alcohol, ethyl alcohol, glycerin or the like; they may be separated after the reaction if desired.

The reaction may be realized in one or more stages.

For example, if a solid vitreous product is desired, either the whole quantity necessary, for example, one molecular proportion of acrolein to one molecular proportion of urea, may be brought into reaction, or the following procedure may be adopted:— The condensation is first allowed to proceed to the viscous syrup stage, there being used for example ½ molecular proportion of acrolein to 1 molecular proportion of urea. This syrup may then be converted into the gelatinous or solid product in a simple manner by adding a further quantity of acrolein to the syrup. For instance, if ½ molecular proportion of acrolein be added to the syrup, the mass becomes more viscous, then gelatinizes and finally hardens. Another aldehyde, such as formaldehyde, may be used instead of acrolein for completing the reaction, that is to say for addition to the aforesaid syrup. When the reaction is conducted in several stages a basic catalyst may be used in one stage and an acid catalyst in another.

In the term "acrolein" also its polymerides, such as disacryl or acrolein resin and in the term "urea" also its derivatives and substitution products, such as thiourea, methylurea shall be included.

The products made by the invention are suitable for various purposes. The highly viscous syrups are valuable as adhesives, varnishes and the like. The solid vitreous products, owing to the ease with which they can be sawn, bored, cut, polished, shaved and the like and to their stability towards physical and chemical influences, may advantageously serve for making shaped objects of all kinds. According to the use to which the material is to be put, dyestuffs, filling materials and agents imparting elasticity may be added to the material.

The following examples illustrate the invention, the parts being by weight:—

*Example 1.*

12 parts of urea are heated with 11.2 parts of acrolein for about an hour at 100° C. in a closed vessel. A transparent vitreous product is obtained.

*Example 2.*

12 parts of urea, 5.6 parts of acrolein and 0.03 part of glacial acetic acid are heated together for one hour at 80° C. in a closed vessel. There is produced a vitreous, transparent, highly viscous mass.

*Example 3.*

60 parts of urea, 10 parts of acetic acid of 10 per cent strength and 20 parts of water are condensed with 28 parts of acrolein at a temperature below 50° C. to form a syrup which is as clear as water. 28 parts of acrolein are then added and the still limpid clear mass is kept for about ½ hour at about 30° C. until it has become strongly viscous. It is now cooled, whereby the mass is changed in a short time into a solid jelly as clear as crystal. By allowing this to remain at ordinary or raised temperature it becomes vitreous and hard.

*Example 4.*

60 parts of urea, 5 parts of water and 0.8 part of sulphuric acid of 1 per cent strength are condensed with 56 parts of acrolein at 40–50° C. The clear syrup is cooled for some hours and then allowed to stand at the ordinary temperature. It becomes a solid jelly which is further hardened as described in Example 3.

*Example 5.*

6 parts of urea, 3 parts of alcohol and 0.2 part of sulphuric acid of 1 per cent strength are condensed with 5.6 parts of acrolein at a temperature below 50° C. The syrup, which is as clear as glass, is further treated as described in Example 3, whereby it is hardened.

*Example 6.*

6 parts of urea, 3 parts of water and 0.2 part of caustic soda solution of 10 per cent strength are condensed with 5.6 parts of acrolein. There is produced a clear yellowish syrup which does not suffer further change. By addition of an acid catalyst, this syrup is transformed into a solid vitreous mass. By adding to the syrup another 5.6 parts of acrolein under basic conditions, the mass becomes more viscous and gelatinizes.

*Example 7.*

30 parts of urea, 10 parts of water containing 0.8 parts of sulphuric acid of 1 per cent strength and 28 parts of acrolein are mixed and the mixture cautiously heated on the water-bath in a reflux apparatus. When nearly all has dissolved another 30 parts of urea are added and the mixture stirred until all the acrolein has undergone condensation. The mixture is now evaporated at a low temperature in a vacuum to produce a highly viscous syrup. Another 28 parts of acrolein are then stirred in and the mixture poured into paraffined moulds, kept at a temperature of about 10–20° C. There is obtained a hard mass as clear as glass.

*Example 8.*

A mixture of 30 parts of urea and 10 parts of water containing 0.5 part of sulphuric acid of 10 per cent strength is mixed with 28 parts of acrolein and cautiously heated on the water-bath. When nearly the whole is dissolved a further quantity of 30 parts of urea is added and the mixture stirred until all the acrolein is condensed. There are then added 82 parts of formaldehyde of 36 per cent strength and the whole is evaporated at a moderate temperature in a vacuum to a viscous syrup. By heating it to about 80° C. this syrup becomes a gummy, solid mass which hardens when heated for a long time.

*Example 9.*

5 parts of wax white acrolein resin, made from acrolein by alkaline condensation, are condensed with 2 parts of urea at about 100° C. There is produced a soft yellowish resin which can combine with further quantities of urea and is thereby hardened.

*Example 10.*

7.6 parts of thiourea are mixed with 2 parts of water and stirred with 5.6 parts of acrolein at 40–50° C. in a reflux apparatus; the reaction occurs immediately. There is produced a clear yellow syrup which becomes more viscous on introduction of a further 5.6 parts of acrolein and on cooling solidifies to an elastic resin.

What we claim is:—

1. A process for the manufacture of aldehyde condensation products by causing acrolein to react with urea.

2. A process for the manufacture of aldehyde condensation products by causing acrolein to react with urea in a closed vessel.

3. A process for the manufacture of aldehyde condensation products by causing acrolein to react with urea in presence of a condensing agent or catalyst.

4. A process for the manufacture of aldehyde condensation products by causing acrolein to react with urea in presence of a solvent or diluent.

5. A process for the manufacture of aldehyde condensation products by causing acrolein to react with urea in a closed vessel and in presence of a condensing agent or catalyst.

6. A process for the manufacture of aldehyde condensation products by causing acrolein to react with urea in a closed vessel and in presence of a solvent or diluent.

7. A process for the manufacture of aldehyde condensation products by causing acrolein to react with urea in presence of a condensing agent or catalyst and of a solvent or diluent.

8. A process for the manufacture of aldehyde condensation products by causing acrolein to react with urea in a closed vessel and in presence of a condensing agent or catalyst and of a solvent or diluent.

9. A process for the manufacture of aldehyde condensation products by causing acrolein to react with urea in several stages.

10. A process for the manufacture of aldehyde condensation products, by causing acrolein to react with urea in several stages, wherein at least in one stage a catalyst is used.

11. A process for the manufacture of aldehyde condensation products, by causing acrolein to react with urea in several stages, wherein a basic catalyst is used in one stage and an acid catalyst in another stage.

12. A process for the manufacture of aldehyde condensation products by causing acrolein and another aliphatic aldehyde, yielding resin-like condensation products with urea, to react with urea.

13. A process for the manufacture of aldehyde condensation products by causing acrolein and formaldehyde to react with urea.

14. A process for the manufacture of aldehyde condensation products by causing acrolein and another aliphatic aldehyde, yielding resin-like condensation products with urea, to react with urea in successive stages.

15. A process for the manufacture of aldehyde condensation products by causing acrolein and formaldehyde to react with urea in successive stages.

16. As new articles of manufacture, valuable in the industry of artificial materials, the herein described condensation products of acrolein with urea.

17. As new articles of manufacture, valuable in the industry of artificial materials, the herein described mixed condensation products of urea, acrolein and another aliphatic aldehyde yielding resin-like condensation products with urea.

18. As new articles of manufacture, valuable in the industry of artificial materials, the herein described mixed condensation products of acrolein and formaldehyde with urea.

19. As new articles of manufacture the herein described initial condensation products of acrolein and urea, constituting viscous syrups which are valuable as adhesives varnishes and the like and which may be transformed into solid, hard, vitreous bodies.

20. As new articles of manufacture the herein described solid condensation products of acrolein and urea constituting hard vitreous bodies which may be sawn, bored, cut, polished, shaved and the like and possess a high stability towards physical and chemical influences and may thus serve for making shaped objects of all kinds.

In witness whereof we have hereunto signed our names this 24 day of September, 1926.

ALPHONSE GAMS.
GUSTAVE WIDMER.